(12) United States Patent
Glock et al.

(10) Patent No.: US 10,439,202 B2
(45) Date of Patent: Oct. 8, 2019

(54) METHOD FOR PRODUCING A HOMOGENOUS PARTICULATE MATERIAL COMPOSITION

(71) Applicant: Robert Bosch GmbH, Stuttgart (DE)

(72) Inventors: Armin Glock, Urbach (DE); Harald Bauer, Ehningen (DE)

(73) Assignee: Robert Bosch GmbH, Stuttgart (DE)

( * ) Notice: Subject to any disclaimer, the term of this patent is extended or adjusted under 35 U.S.C. 154(b) by 154 days.

(21) Appl. No.: 15/689,131

(22) Filed: Aug. 29, 2017

(65) Prior Publication Data

US 2018/0076446 A1 Mar. 15, 2018

(30) Foreign Application Priority Data

Sep. 13, 2016 (DE) .................. 10 2016 217 373

(51) Int. Cl.
| | |
|---|---|
| *H01B 1/24* | (2006.01) |
| *H01M 4/1391* | (2010.01) |
| *H01G 9/032* | (2006.01) |
| *H01G 11/50* | (2013.01) |
| *H01M 4/131* | (2010.01) |
| *H01G 11/38* | (2013.01) |
| *H01G 11/46* | (2013.01) |
| *H01G 11/86* | (2013.01) |
| *H01M 4/525* | (2010.01) |
| *H01M 4/62* | (2006.01) |

(52) U.S. Cl.
CPC ............ *H01M 4/1391* (2013.01); *H01B 1/24* (2013.01); *H01G 9/032* (2013.01); *H01G 11/38* (2013.01); *H01G 11/46* (2013.01); *H01G 11/50* (2013.01); *H01G 11/86* (2013.01); *H01M 4/131* (2013.01); *H01M 4/525* (2013.01); *H01M 4/622* (2013.01); *H01M 4/625* (2013.01)

(58) Field of Classification Search
CPC .......... H01B 1/24; H01G 11/50; H01G 9/032; H01G 11/38; H01G 11/46; H01G 11/86; H01M 4/1391; H01M 4/131; H01M 4/525; H01M 4/622; H01M 4/625
See application file for complete search history.

(56) References Cited

U.S. PATENT DOCUMENTS

| | | | | |
|---|---|---|---|---|
| 4,277,185 A | * | 7/1981 | Thompson ............ | B01F 9/0016 366/213 |
| 4,556,618 A | * | 12/1985 | Shia ........................ | H01M 4/08 264/127 |
| 7,087,348 B2 | | 8/2006 | Holman et al. | |
| 2013/0059199 A1 | * | 3/2013 | Hara ..................... | H01M 4/131 429/188 |
| 2014/0004418 A1 | | 1/2014 | Kobayashi et al. | |
| 2014/0127570 A1 | | 5/2014 | Dandrea | |
| 2015/0030936 A1 | * | 1/2015 | Matsumura ........... | H01M 4/133 429/235 |
| 2015/0061176 A1 | | 3/2015 | Bruckner et al. | |
| 2015/0062779 A1 | | 3/2015 | Bankaitis et al. | |
| 2015/0072234 A1 | | 3/2015 | Mitchell et al. | |
| 2015/0303481 A1 | * | 10/2015 | Duong ................. | H01G 9/0425 429/217 |

FOREIGN PATENT DOCUMENTS

| | | |
|---|---|---|
| EP | 1644136 A2 | 4/2006 |
| EP | 1723080 B1 | 6/2014 |
| JP | 2011-014262 A | 1/2011 |

OTHER PUBLICATIONS

Philippe Knauth, "Inorganic solid Li ion conductors: An overview," Solid State Ionics, vol. 180, issues 14-16, Jun. 25, 2009, pp. 911-916.
C. Cao et al., "Recent advances in inorganic solid electrolytes for lithium batteries," Front. Energy Res., Jun. 27, 2014, 2:25.

* cited by examiner

*Primary Examiner* — Mark Kopec
*Assistant Examiner* — Jaison P Thomas
(74) *Attorney, Agent, or Firm* — Norton Rose Fulbright US LLP; Gerard Messina

(57) ABSTRACT

A method is provided for producing a homogenous particulate material composition, including at least one particulate material M, at least one additive Z, and at least one binding agent B, the method including providing at least one particulate material M, at least one additive Z, and at least one binding agent B; producing a homogenous mixture G1 from the at least one particulate material M and the at least one additive Z in a gravity mixer; producing a mixture G2 from the mixture G1 and the at least one binding agent B, with the introduction of shear forces; and removing dispersed gases from the mixture G2.

9 Claims, No Drawings

METHOD FOR PRODUCING A HOMOGENOUS PARTICULATE MATERIAL COMPOSITION

CROSS REFERENCE

The present application claims the benefit under 35 U.S.C. § 119 of German Patent Application No. DE 102016217373.1 filed on Sep. 13, 2016, which is expressly incorporated herein by reference in its entirety.

FIELD

The present invention relates to a method for producing a homogenous particulate material composition, in particular an electrode active material composition.

BACKGROUND INFORMATION

The performance, in particular the energy density, of electrochemical energy storage systems such as lithium-ion batteries (LIB) is generally a function of the choice and realization of the electrodes in the cell. Conventionally, two fundamentally different methods are described for coating the current collector with the electrode active material (also called active material hereinafter), namely the application of an active material slurry (the so-called slurry method), and the application of a free-standing active material foil.

Production methods using the slurry method are described for example in Japan Patent Application No. JP 2011-014262 and U.S. Patent Appl. Pub. No. 2014/0004418. In the production of active material slurries, in particular when the production process is at a standstill difficulties result because the mixing facilities have to be able to process large quantities of active material slurries, and separation of the components occurs quickly when mixing is inadequate.

The production of electrodes from free-standing active material foils is described for example in European Patent No. EP 1 644 136, U.S. Patent Appl. Pub. No. 2015/0061176 A1, U.S. Patent Appl. Pub. No. 2015/0062779 A1, U.S. Pat. No. 7,087,348 B2, U.S. Patent Appl. Pub. No. 2015/0072234, and U.S. Patent Appl. Pub. No. 2014/0127570. The free-standing active material foil is produced in a solvent-free method, standardly with a layer thickness of approximately 100-300 μm. The free-standing foil is cut to the desired size as needed, and is subsequently applied onto a pre-shaped current collector. The cutting of the electrode can also take place in a laminated composite of current collector and active material foil.

Conventionally, in the production of the free-standing active material foil an active material composition is provided including at least one electrode active material and at least one particulate binding agent, as well as, if warranted, at least one conductive additive, through the introduction of shear forces (e.g., through the use of mechanical mills such as jet or ball mills), forming fibrils from the binding agent particles. The compound can be shaped to form a stable, free-standing active material foil, e.g., with the aid of an extruder and/or a calendar.

European Patent No. EP 1 644 136 uses a jet mill for the fibrillation of the binding agent. Here, due to the collisions with other particles, the polymer binding agent experiences high shear forces such that a plasticization of the polymer occurs at least locally. This polymer then adheres to the particle surfaces with which the collision took place, in particular on the active material particles. In this method, it is problematic that in the jet mill agglomerates of the polymer binding agent first have to be broken up. For this purpose, low temperatures are necessary, in particular temperatures below the glass transition temperature $T_g$ of the binding agent. On the other hand, a plasticization of the binding agent that is as good as possible is desired. However, this requires temperatures above the $T_g$ of the polymer. In the existing art, the binding agent is therefore first mixed with the conductive additive in a mill having a rotary mixing tool in order to break up the polymer agglomerates through the filling of the surface of the binding agent particles. The subsequent fibrillation process in the jet mill then takes place at temperatures above the $T_g$ of the binding agent. However, this procedure requires an additional method step.

U.S. Patent Appl. Pub. No. 2015/0062779 A1 describes first the cooling of an active material composition including active material particles, conductive additive, and binding agent particles, in order in this way to bring about a breaking up of the agglomerate of binding agent particles ahead of time in a mechanical mill having a rotary mixing tool. This is followed by the targeted fibrillation of the binding agent in a jet mill.

In order to make it possible to carry out a method that is as continuous as possible, it is desirable to keep the runup and rundown of the mixing duration until the desired product is obtained as short as possible, and to achieve a stationary state of the fibrillation step as quickly as possible. This is important in particular because the grinding process carried out in the jet mill leads over the long term to disintegration of the contained particles. Recycling of the reject product produced in the runup and rundown of the mixing process is therefore possible only to a very limited extent, because the portion of fine particles in the active material composition increases during a longer milling process, which has a disadvantageous effect on the performance of the product. The production of consistent products can be realized only with difficulty. Moreover, in jet mills there are different dwell times of the components of the composition. Because the grinding performance of large jet mills is generally better than the performance of small jet mills, methods using jet mills are difficult to apply on a large scale. Here, the increased grinding power has a negative effect on the product characteristics.

U.S. Patent Appl. Pub. No. 2015/0061176 A1 uses a classical form of mixing technology, the components of the active material composition being supplied to a ball mill and mixed using inert mill balls. After the termination of the mixing process, the mill balls however have to be removed from the pastelike active material composition, which is difficult. Adhesion to the surfaces of the mill also causes material losses and production standstills.

Due to their specific method steps, the described production methods are inadequately suited for the preparation of material compositions having a high degree of homogeneity without placing excessive mechanical loads on the components. Frequently, the formation of agglomerates is observed, in particular the formation of binding agent agglomerates.

U.S. Pat. No. 7,087,348 B2 describes a method in which first the surface of the active material is filled at least 50%, preferably at least 75%, with a composition that includes an electrically conductive material. This enables a good electrical connecting of the active material to the current collector. Disadvantageous here is the interaction, made more difficult by the large-surface occupation of the surface of the active material particles, of the active material with the charge bearers (in particular the lithium cations) from the electrolyte composition during the operation of the electrode.

SUMMARY

An object of the present invention is to provide a method for producing a particulate material composition that has a high degree of homogeneity and offers consistently qualitatively high-value results with as little loss as possible of time and material. It should be possible to realize the method using simple means. This object may be achieved in accordance with the present invention.

The present invention relates to a method for producing a homogenous particulate material composition, in particular an electrode active material composition, including at least one particulate material M, at least one additive Z, and at least one binding agent B, the method including the following method steps:
a) provision of at least one particulate material M, at least one additive Z, and at least one binding agent B;
b) production of a homogenous mixture G1 from the at least one particulate material M and the at least one additive Z in a gravity mixer;
c) production of a mixture G2 from the mixture G1 and the at least one binding agent B, with the introduction of shear forces;
d) removal of dispersed gases from mixture G2.

Particulate material M can be any material from which particles can be formed and that can be bonded to form a shapeable compound using a fiber-type binding agent. This includes for example, as active material for the negative electrode of a lithium-ion battery, amorphous silicon, which can form alloy compounds with lithium atoms. But carbon compounds, such as graphite, can also be used as active material for negative electrodes. As active material for the positive electrode of a lithium-ion battery, for example lithiated intercalation compounds may be used, which are capable of reversibly accepting and releasing lithium ions. The positive active material can include a compounded oxide or phosphate containing at least one metal selected from the group of cobalt, magnesium, nickel, and lithium. Preferred examples include in particular $LiMn_2O_4$, $LiFePO_4$, $Li_{1.17}N_{0.17}Co_{0.1}Mn_{0.56}O_2$, $LiCoO_2$, and $LiNiO_2$.

With regard to further areas of application of electrodes produced according to the present invention, in particular with regard to electrodes for fuel cells and electrolyzers, particulate compositions, including graphite, activated carbon, or carbon nanotubes, may be used as further active materials.

The particle size of the particulate material M is ideally adapted to the desired properties of the adapted material. For example, the material M has an average particle size of, preferably, 1 to 30 µm, more preferably 2 to 20 µm, in particular 3 to 15 µm. In a particularly preferred specific embodiment, the material M has an average particle size of from 5 to 10 µm. An excessively large portion of particles having a very small particle size, in particular a particle size less than 1 µm, would significantly reduce the diffusion in the active material layer and would increase the surface of the active material. This is to be avoided with regard to undesirable side reactions that may occur on the surface, in particular in the context of the formation of a solid electrolyte interface (SEI).

The binding agent B preferably includes a polymer material selected from styrene butadiene copolymer (SPR), polyvinylidene fluoride (PVDF), polytetrafluoroethylene (PTFE) and ethylene propylene diene monomer (EPDM).

Particularly preferably, binding agent B includes at least PVDF and/or PTFE. In a preferred specific embodiment, binding agent B includes PVDF.

In a specific embodiment, binding agent B is present in particulate form having an average particle diameter of 50 to 200 µm, in particular 75 to 150 µm. In a further specific embodiment, the binding agent is present in the form of fibers having an average diameter of 10 to 100 µm, in particular 20 to 80 µm, and an average fiber length of 5 to 50 µm, in particular 10 to 40 µm. Particularly preferred are coaxially spun fibers having a core of PVDF and a jacket of PTFE. These can be produced for example using an electrospinning method, and combine good adhesive properties with outstanding stability.

Additive Z preferably includes conductive additives such as carbon black or graphite, and is present in powdered form.

Particulate material M, polymer binding agent B, and additive Z can be produced using any method known to those skilled in the art.

As an additional component, in a specific embodiment the active material composition can include at least one solid-body electrolyte, in particular an inorganic solid-body electrolyte, that is capable of conducting ions, in particular lithium ions. According to the present invention, such solid inorganic lithium ion conductors include crystalline, composite, and amorphous inorganic solid lithium-ion conductors. Crystalline lithium-ion conductors include in particular lithium-ion conductors of the perovskite type, lithium lanthanum titanate, lithium-ion conductors of the NASICON type, lithium-ion conductors of the LISICON and thio-LISICON type, and lithium ion-conducting oxides of the garnet type. The composite lithium-ion conductors include in particular materials that contain oxides and mesoporous oxides. Such solid inorganic lithium-ion conductors are described for example in the article by Philippe Knauth, "Inorganic solid Li ion conductors: An overview," Solid State Ionics, vol. 180, issues 14-16, 25 Jun. 2009, pages 911-916. According to the present invention, all solid lithium-ion conductors can also be included that are described by C. Cao et al. in "Recent advances in inorganic solid electrolytes for lithium batteries," Front. Energy Res., 2014, 2:25. In particular, the garnets described in European Patent No. EP 1723080 B1 are also included according to the present invention. The solid-body electrolyte can be used in particular in the form of particles having an average particle diameter of $\geq 0.05$ µm to $\leq 5$ µm, preferably $\geq 0.1$ µm to $\leq 2$ µm. If the active material composition includes a solid-body electrolyte, this can for example make up 0 to 50 wt %, preferably 10 to 40 wt %, of the active material composition.

In a further method step b), a mixture G1 is produced of the at least one particulate material M and the at least one additive Z. This takes place using a gravity mixer. This makes it possible to produce a mixture having high homogeneity from components having different particle sizes and different density, without exposing the components to a high degree of mechanical loading. In addition, the homogenous mixture G1 is obtained within a short time, so that no run-up time is necessary. Standardly, a homogenous mixing takes place within $\leq 30$ minutes, preferably within $\leq 10$ minutes, in particular within $\leq 5$ minutes.

Concrete examples of a gravity mixer are a fluidized bed mixer, or free fall of the components in a tube. A part of the gravity mixing process can also take place using static mixers or concentric nozzles.

In a further method step c), a mixture G2 is produced from mixture G1 and the at least one binding agent B, with the application of shear forces. This is done with the aid of a mixing or conveying device that is suitable for inputting high shear forces into the mixed or conveyed material. Preferred examples of this are jet mills or extruders having a suitable design that include a compression zone for inputting shear energy. Particularly preferably, jet mills are used.

Here, method step c) can be carried out first with low energy input, so that a mixing is achieved without causing fibrillation of binding agent B.

Through the inputted shear energy, an at least partial plasticization of binding agent B is brought about. In this way, the binding agent can bond to the surfaces of particulate material M and/or of additive Z. With adequate energy input, fibrillation of binding agent B occurs, so that a plurality of particles of the composition having fibers formed from binding agent B are linked to one another. To support the fibrillation of binding agent B, this method step can additionally take place with the supply of thermal energy. Preferably, this method step is carried out for example at a temperature above glass transition temperature $T_g$ of at least one binding agent B that is used.

Due to the fact that a homogenous mixture of particulate material M and additive Z is present already before the fibrillation of binding agent B, the method carried out in this way makes it possible to reduce the dwell time of the components of the active material composition with introduction of shear forces. This protects the individual components and shortens the production duration.

The obtained mixture G2 can subsequently be freed of enclosed or dispersed gases. This can take place for example by reducing the pressure surrounding mixture G2. For this purpose, in particular a downdraft vaporizer can be used.

In a preferred specific embodiment, additive Z is carbon black or carbon nanotubes. These additives act as conductive additives in the material composition and ensure a conductive contact of material M, in particular an electrode active material, to the current collector of an electrode.

Preferably, in this case material M is mixed, in method step b), with only a portion of additive Z, the quantity of additive Z being selected such that it can cover at most 50% of the surface of material M. For the use of the material composition as electrode active material, it is important that the surface of the material M (i.e. of the electrode active material) is not completely filled with additive Z. This additive acts as a dispergent and in this way prevents the formation of undesired agglomerates. On the other hand, an excessive filling of the surface of material M however prevents the bonding of binding agent B thereon, and results in a reduced hold in the final material composition. Therefore, in this specific embodiment the quantity of additive Z is preferably selected such that the surface of the material M is filled only up to <50%, in particular ≤40%, with the at least one additive Z.

The remaining part of additive Z is preferably first mixed, in a further method step b'), with binding agent B in order to form a mixture G3 that is used instead of pure binding agent B in the subsequent method step c). This mixing process can take place, with regard to the method, using any mixing apparatus known to those skilled in the art. Examples include solid material mixers having installed parts, gravity mixers, mixing nozzles, in particular concentric nozzles, milling apparatuses operated outside of the functional area of milling (e.g. jet mills, at operating points of low performance density) and separating apparatuses such as gas cyclones, fluidized beds, or air separators.

In method step b'), a homogenous mixture G3 of binding agent particles B is obtained on whose surface additive Z is applied. Due to the high affinity of binding agent B and additives Z to one another, agglomerates of binding agent B and/or of additives Z are broken up, in particular when carbon nanotubes are used. Preferably, the quantity of additive Z is selected such that here as well a complete occupation of the surface of binding agent B does not take place. This enables a better adhesion of the binding agent particles on the surface of material M.

Preferably, method step b') is carried out at a temperature that is below the glass transition temperature of binding agent B. This can be achieved for example by adding a suitable coolant, in particular by adding liquid nitrogen or dry ice. Through this measure, a premature plasticization of binding agent B is avoided.

In a further preferred specific embodiment, the remaining part of additive Z is first mixed with a part of binding agent B, e.g. ≤50 wt %, in particular ≤40 wt %, relative to the overall weight of binding agent B. Subsequently, mixture G3 obtained in this way is processed with mixture G1 and remaining binding agent B to form a mixture G2, with input of kinetic and/or thermal energy. Because only a portion of the binding agent particles is used for this purpose, the adhesion of the rest of the binding agent particles B to the surfaces of material particles M is not disturbed. A material composition is obtained that has adequate stability.

The subject matter of the present invention also includes an active material composition for an electrode including at least one electrode active material M, at least one additive Z, and at least one binding agent B that were produced according to the method described above. Such an electrode active material composition can advantageously be used in the production of a free-standing electrode active material foil. A free-standing electrode active material foil produced in this way is distinguished by a high degree of homogeneity, stability, and conductivity. These properties have a positive effect on the properties of electrodes that include such free-standing electrode active material foils. Such an electrode is also part of the subject matter of the present invention and can for example be used in electrochemical energy storage systems. These include in particular lithium-ion batteries, supercapacitors, and hybrid supercapacitors. Further areas of application for the electrodes produced according to the present invention are electrolyzers or fuel cells.

The example embodiments of the present invention described above enables the production of homogenous mixtures of components having different properties, such as particulate materials (in particular electrode active materials), powdered additives, and particulate or fibrillated binding agents, within a short time and using simple apparatus and methods. The obtained material composition is in addition distinguished by a good cohesion of the components, brought about by the binding agent. In this way, it is possible to form free-standing material layers from the material composition. In contrast to the conventional art, the components are not subjected to strong mechanical loads, and the dwell time in the individual mixing apparatuses is significantly less. Standing times due to cleaning work and run-up times in order to achieve homogenous mixtures are reduced.

DETAILED DESCRIPTION OF EXAMPLE EMBODIMENTS

A composition made up of 90 wt % $LiMn_2O_4$ particles (average particle size: 10 μm), 5 wt % carbon nanotubes, and 5 wt % PVDF particles (average particle size: 50 μm), relative to the overall weight of the composition, is produced. For this purpose, the components are first weighed separately from one another.

Half of the carbon nanotubes (i.e., 2.5 wt %, relative to the overall weight of the composition) is briefly mixed, in a gravity mixer, with all of the $LiMn_2O_4$ particles (90 wt %, relative to the overall weight of the composition), in order in this way to form a mixture G1. The mixing duration is less than 10 minutes.

Parallel thereto, or at a different time, the remaining portion of the carbon nanotubes (i.e. 2.5 wt %, relative to the overall weight of the composition) is mixed with half the PVDF particles (i.e., 2.5 wt %, relative to the overall weight of the composition), also in a gravity mixer, in order in this way to form a mixture G3. The mixing duration is less than 10 minutes.

Subsequently, the obtained mixture G1, the obtained mixture G3, and the remaining PVDF particles (i.e. 2.5 wt % relative to the overall weight of the composition) are mixed in a jet mill, with input of a high degree of kinetic energy, over a time period of less than 20 minutes, preferably less than 15 minutes, in particular less than 10 minutes, e.g. 5 minutes. A pastelike mixture G2 is obtained.

Mixture G2 is now freed of dispersed gas at reduced pressure, e.g. 0.5 bar. Subsequently, the material composition obtained in this way can be processed, using a calendar, to form a free-standing electrode active material foil. This foil can be cut to the desired size. The foils obtained in this way are placed on at least one surface of a current collector, and are compressed and applied using rollers. Preferably, free-standing electrode material foils are applied on at least two surfaces of the current collector. This step can also take place at high temperature, e.g. >100° C., in particular >150° C. The electrode produced in this way is combined, together with a second electrode and a separator situated between the electrodes, in a suitable housing made of metal (e.g. aluminum) or plastic, to form a cell, the electrodes each being connected to terminals via which a flow of current can take place. The housing is filled with electrolyte, so that the electrolytes surrounds and penetrates the electrodes and the separator. The cells produced in this way can be connected to one another in series or in parallel. Depending on the choice of the second electrode, in this way a lithium-ion battery or a hybrid supercapacitor can be provided as an electrochemical energy storage system.

The present invention is not limited to the exemplary embodiments described here and the aspects emphasized therein. Rather, in accordance with the present invention, a large number of modifications are possible that are within the competence of those skilled in the art.

What is claimed is:

1. A method for producing a homogenous particulate material composition, including at least one particulate material M, at least one additive Z, and at least one binding agent B, the method comprising:
   a) providing at least one particulate material M, at least one additive Z, and at least one binding agent B;
   b) producing a homogenous mixture G1 from the at least one particulate material M and the at least one additive Z in a gravity mixer;
   c) producing a mixture G2 from the mixture G1 and the at least one binding agent B, with the introduction of shear forces; and
   d) removing dispersed gases from the mixture G2.

2. The method as recited in claim 1, wherein the mixture G2 includes a fibrillated binding agent B.

3. The method as recited in claim 1, wherein a jet mill is used to produce the mixture G2 in order to introduce shear forces necessary for the fibrillation of the binding agent B into the mixture.

4. The method as recited in claim 1, wherein the dispersed gases is removed from the mixture G2 in step d) under reduced pressure, in particular in a downdraft vaporizer.

5. The method as recited in claim 1, wherein the particulate material M is mixed, in method step b), with only a portion of the additive Z, a quantity of the additive Z being selected such that the additive Z occupies at most 50% of the surface of the particulate material M.

6. The method as recited in claim 5, wherein a remaining portion of the additive Z is first being mixed, in a further method step b'), with at least the binding agent B to form a mixture G3 that subsequently replaces the pure binding agent B in the step c).

7. The method as recited in claim 1,
   wherein the particulate material composition is used in an electrode active material.

8. The method as recited in claim 1,
   wherein the particulate material composition is used in an electrode active material, and wherein the electrode active material is used in a free-standing electrode active material foil.

9. The method as recited in claim 8, wherein the free-standing electrode active material foil is used to produce an electrode for an electrochemical energy storage system, an electrolyzer, or a fuel cell.

* * * * *